(12) United States Patent
Spangler

(10) Patent No.: US 9,988,913 B2
(45) Date of Patent: Jun. 5, 2018

(54) USING INSERTS TO BALANCE HEAT TRANSFER AND STRESS IN HIGH TEMPERATURE ALLOYS

(71) Applicant: United Technologies Corporation, Hartford, CT (US)

(72) Inventor: Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 488 days.

(21) Appl. No.: 14/738,001

(22) Filed: Jun. 12, 2015

(65) Prior Publication Data

US 2017/0058679 A1    Mar. 2, 2017

Related U.S. Application Data

(60) Provisional application No. 62/024,518, filed on Jul. 15, 2014.

(51) Int. Cl.
*F01D 5/18* (2006.01)
*B23P 15/02* (2006.01)
(Continued)

(52) U.S. Cl.
CPC ............ *F01D 5/188* (2013.01); *B23P 15/02* (2013.01); *F01D 5/282* (2013.01); *F01D 5/284* (2013.01);
(Continued)

(58) Field of Classification Search
CPC .......... F01D 5/188; F01D 5/282; F01D 5/284; F01D 9/041; F01D 25/12; F01D 5/189;
(Continued)

(56) References Cited

U.S. PATENT DOCUMENTS 3,475,107 A * 10/1969 Auxier .................... F01D 5/189
                                                              415/115
3,965,963 A     6/1976 Phipps et al.
(Continued)

FOREIGN PATENT DOCUMENTS

EP     1106781 A1    6/2001
EP     1626162 A1    2/2006
(Continued)

OTHER PUBLICATIONS

Sanna Franzen & Joakim Karlsson, γ-Titanium Aluminide Manufactured by Electron Beam Melting, 2010, p. iii.*
(Continued)

*Primary Examiner* — Dwayne J White
*Assistant Examiner* — Justin A Pruitt
(74) *Attorney, Agent, or Firm* — Carlson, Gaskey & Olds, P.C.

(57) ABSTRACT

A method for forming a gas turbine engine component comprises the steps of forming a block of a high temperature alloy material. An external surface of the block is machined to form an external surface of a gas turbine engine component. At least one cooling passage within the component that is open to at least one end of the component is machined. At least one insert with a heat transfer feature is formed. The insert is installed within the at least one cooling passage. A component for a gas turbine engine is also disclosed.

22 Claims, 5 Drawing Sheets

(51) Int. Cl.
    *F01D 5/28* (2006.01)
    *F01D 9/04* (2006.01)
    *F01D 25/12* (2006.01)

(52) U.S. Cl.
    CPC ............ *F01D 9/041* (2013.01); *F01D 25/12* (2013.01); *F05D 2220/32* (2013.01); *F05D 2230/10* (2013.01); *F05D 2230/232* (2013.01); *F05D 2230/60* (2013.01); *F05D 2240/11* (2013.01); *F05D 2240/12* (2013.01); *F05D 2240/30* (2013.01); *F05D 2240/35* (2013.01); *F05D 2260/201* (2013.01); *F05D 2260/221* (2013.01); *F05D 2260/2212* (2013.01); *F05D 2300/131* (2013.01); *F05D 2300/20* (2013.01); *F05D 2300/6033* (2013.01); *Y02T 50/672* (2013.01); *Y02T 50/676* (2013.01)

(58) Field of Classification Search
    CPC ... F01D 5/18; B23P 15/02; F05D 2260/22141
    USPC ..................................................... 416/96 A
    See application file for complete search history.

(56) References Cited

U.S. PATENT DOCUMENTS

| | | | |
|---|---|---|---|
| 4,153,386 A | 5/1979 | Leogrande et al. | |
| 4,312,624 A | 1/1982 | Steinbauer, Jr. et al. | |
| 4,542,867 A | 9/1985 | Memmen | |
| 5,207,556 A | 5/1993 | Frederick et al. | |
| 5,259,730 A | 11/1993 | Damlis et al. | |
| 6,193,465 B1 | 2/2001 | Liotta et al. | |
| 6,318,963 B1 | 11/2001 | Emery et al. | |
| 7,070,386 B2 | 7/2006 | Kessler et al. | |
| 8,152,468 B2 | 4/2012 | Propheter-Hinckley et al. | |
| 8,348,613 B2 | 1/2013 | Gregg et al. | |
| 8,353,668 B2 | 1/2013 | Propheter-Hinckley et al. | |
| 8,393,867 B2 | 3/2013 | Chon et al. | |
| 8,480,366 B2 | 7/2013 | Malecki et al. | |
| 2006/0034679 A1* | 2/2006 | Harding | F01D 5/189 415/115 |
| 2010/0054915 A1 | 3/2010 | Devore et al. | |
| 2014/0079540 A1* | 3/2014 | Morris | B22F 3/1055 415/178 |
| 2014/0093392 A1* | 4/2014 | Tibbott | F01D 5/189 416/97 R |
| 2015/0159489 A1* | 6/2015 | Lee | F01D 5/189 416/97 R |
| 2015/0292339 A1* | 10/2015 | De Ponnat | B23P 15/02 416/241 R |
| 2015/0375359 A1* | 12/2015 | Cui | B24B 1/005 451/59 |

FOREIGN PATENT DOCUMENTS

| | | |
|---|---|---|
| GB | 811586 A | 4/1959 |
| GB | 2058944 A | 4/1981 |
| WO | 2015/023338 | 2/2015 |

OTHER PUBLICATIONS

David Madsen, "Engineering Drawing and Design", Delmar Cengage Learning, 6th Edition, Feb. 17, 2016, p. 467.*
Forging Industry Association, "How Are Forgings Produced", Jan. 25, 2012.*
Rayotek, "Precision Waterjet Cutting", Materials Cut and Processed, Jun. 24, 2013.*
European Search Report for European Application No. 15176860.3 completed Nov. 23, 2015.

* cited by examiner

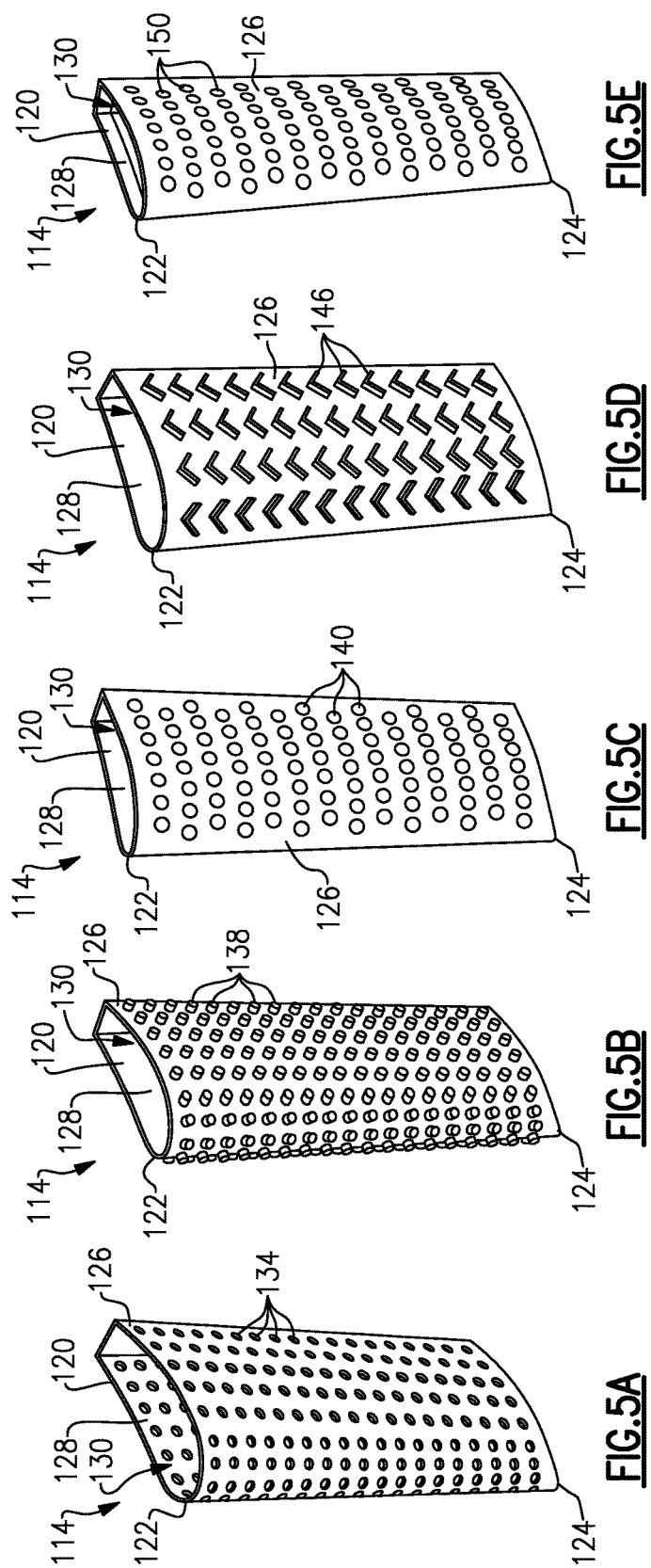

USING INSERTS TO BALANCE HEAT TRANSFER AND STRESS IN HIGH TEMPERATURE ALLOYS

CROSS-REFERENCE TO RELATED APPLICATION

This application claims priority to U.S. Provisional Patent Application No. 62/024,518, filed Jul. 15, 2014.

BACKGROUND OF THE INVENTION

In pursuit of higher engine efficiencies, higher turbine inlet temperatures have been relied upon to boost overall engine performance. This can result in gas path temperatures that may exceed melting points of traditional turbine component materials. To address this issue, components such as rotating blades and stator vanes, for example, are made from materials that can withstand higher operating temperatures, such as high temperature alloys.

When using traditional materials for the airfoils, such as a nickel alloy material for example, additional heat transfer treatments are needed to generate a desired amount of heat transfer. In one known example, internal cooling passages are formed within the airfoils. To further augment this internal cooling, the internal cooling passages in some nickel alloy airfoils have been configured to include heat transfer treatments such as trip strips formed on passage walls, for example. As high temperature alloys can withstand higher metal temperatures, components made from these materials do not require the same amount of cooling. However, some additional heat transfer treatments are still needed to provide the desired cooling effect. As the stress capability of the high temperature alloys is significantly less than traditional materials, incorporating the additional heat transfer features has proven to be challenging.

SUMMARY OF THE INVENTION

In a featured embodiment, a method for forming a gas turbine engine component includes forming a block of a high temperature alloy material. An external surface of the block is machined to form an external surface of a gas turbine engine component. At least one cooling passage is machined within the component to be open to at least one end of the component. At least one insert with a heat transfer feature is formed. The insert is installed within the at least one cooling passage.

In another embodiment according to the previous embodiment, the high temperature alloy material can withstand operating temperatures within a range of 2400-2700 degrees Fahrenheit.

In another embodiment according to any of the previous embodiments, the high temperature alloy material comprises molybdenum or a monolithic ceramic material.

In another embodiment according to any of the previous embodiments, forming a block of a high temperature alloy material includes forging the block as a single piece structure.

In another embodiment according to any of the previous embodiments, machining an external surface of the block to form an external surface of a gas turbine engine component is performed prior to machining at least one cooling passage within the component that is open to at least one end of the component.

In another embodiment according to any of the previous embodiments, to machining at least one cooling passage within the component that is open to at least one end of the component is performed prior to machining an external surface of the block to form an external surface of a gas turbine engine component.

In another embodiment according to any of the previous embodiments, wherein machining at least one cooling passage within the component that is open to at least one end of the component includes machining the cooling passage to have smooth walls.

In another embodiment according to any of the previous embodiments, wherein the machining the cooling passages step includes machining at least first and second cooling passages, and further including inserting a first insert into the first cooling passage and inserting a second insert into the second cooling passage.

In another embodiment according to any of the previous embodiments, the insert is welded to the airfoil body.

In another embodiment according to any of the previous embodiments, the forming the insert step includes forming the insert as a hollow body that is open to at least one end of the insert, the insert having the heat transfer feature formed on at least one of an external surface and an internal surface of the insert.

In another embodiment according to any of the previous embodiments, at least one heat transfer feature is formed as a plurality of cooling holes that extend from the internal surface to the external surface of the insert.

In another embodiment according to any of the previous embodiments, at least one heat transfer feature is formed as a plurality of pins extend outwardly from a surface of the insert into the cooling passage.

In another embodiment according to any of the previous embodiments, at least one heat transfer feature is formed as a plurality of rounded protrusions extend outwardly from a surface of the insert into the cooling passage.

In another embodiment according to any of the previous embodiments, at least one heat transfer feature is formed as a plurality of trip strips extend outwardly from a surface of the insert into the cooling passage.

In another embodiment according to any of the previous embodiments, at least one heat transfer feature is formed as a plurality of dimples form recesses on a surface of the insert.

In another featured embodiment, a component for a gas turbine engine comprises a body formed from a high temperature alloy material. At least one cooling passage is formed in the body, and has smooth walls. At least one insert with a heat transfer feature is positioned within at least one cooling passage.

In another embodiment according to the previous embodiment, the high temperature alloy material can withstand operating temperatures within a range of 2400-2700 degrees Fahrenheit.

In another embodiment according to any of the previous embodiments, the high temperature alloy material comprises molybdenum, a monolithic ceramic material, or a ceramic matrix composite material.

In another embodiment according to any of the previous embodiments, the insert has a first surface facing the cooling passage and a second surface facing away from the cooling passage. At least one heat transfer feature comprises at least one of a plurality of cooling holes that extend from the second surface to the first surface of the insert, a plurality of pins extend outwardly from the first surface of the insert into the cooling passage, a plurality of rounded protrusions extend outwardly from the first surface of the insert into the cooling passage, a plurality of trip strips extend outwardly from the first surface of the insert into the cooling passage, or a plurality of dimples forming recesses on the insert.

In another embodiment according to any of the previous embodiments, the body comprises one of a gas turbine engine vane, blade, BOAS, or combustor panel.

The foregoing features and elements may be combined in any combination without exclusivity, unless expressly indicated otherwise.

These and other features may be best understood from the following drawings and specification.

BRIEF DESCRIPTION OF THE DRAWINGS

FIG. 5A is one example of an insert.

FIG. 5B is another example of an insert.

FIG. 5C is another example of an insert.

FIG. 5D is another example of an insert.

FIG. 5E is another example of an insert.

DETAILED DESCRIPTION

Figure 1:
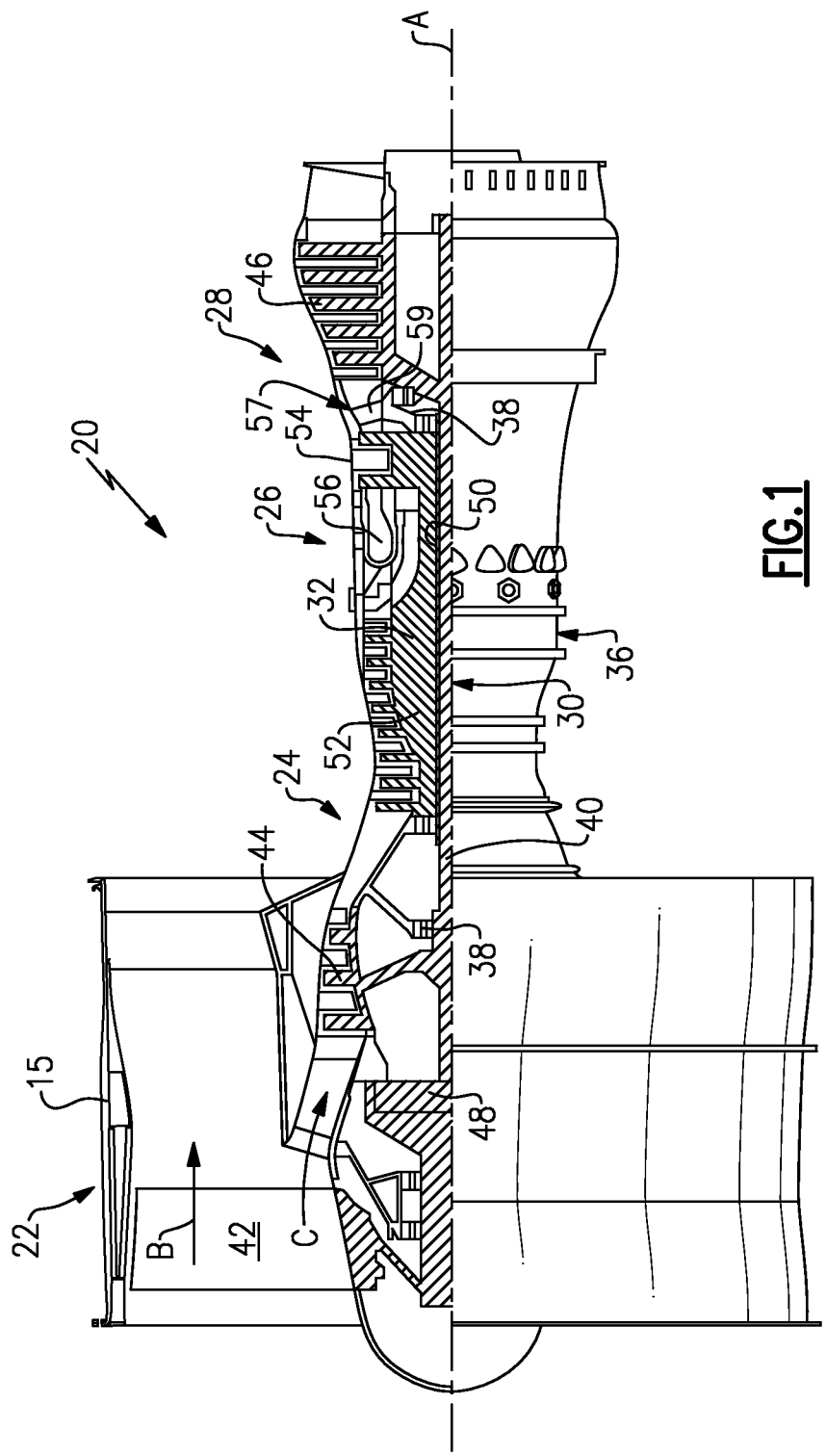
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
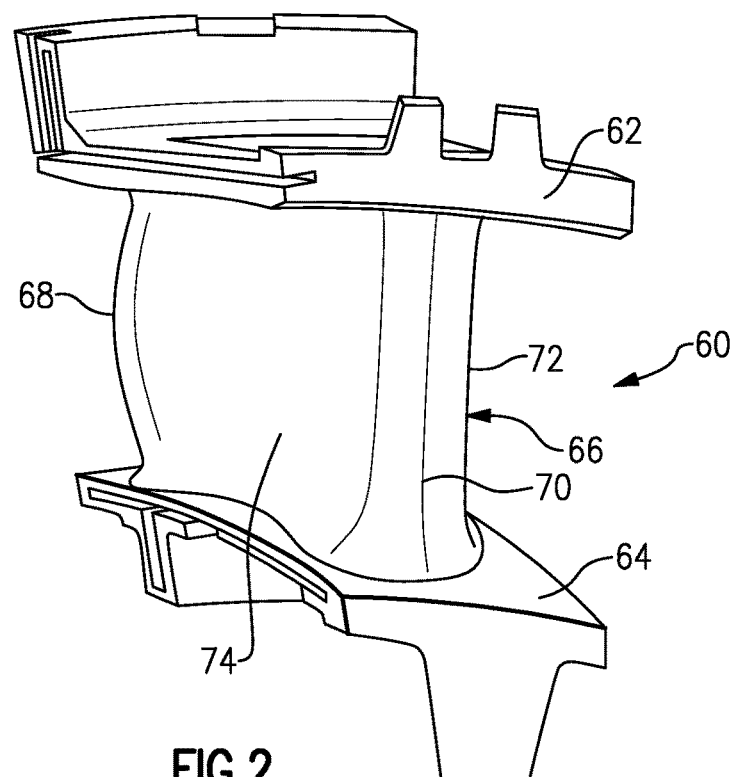
FIG. 2 is a side perspective view of a turbine vane.

Airfoils located downstream of the combustor section 26, such as stator vanes and rotor blades in the turbine section 28 for example, operate in a high-temperature environment. Airfoils that are exposed to high temperatures typically include cooling circuits with internal cooling channels that direct a flow of cooling air through the airfoil to remove heat and prolong the useful life of the airfoil. FIG. 2 is a side view of a turbine rotor vane 60 having an outer vane platform 62 and an inner vane platform 64 radially spaced apart from each other, and an airfoil section 66 extending radially between outer vane platform 62 and inner vane platform 64. The airfoil section 66 includes a leading edge 70, a trailing edge 68, a suction side wall 72, and a pressure side wall 74. Although a vane 60 is discussed in this disclosure, it should be understood that the invention also applies to other hardware such as blades, BOAS, combustor panels, etc.

Due to the high operating temperatures to which the vanes 60 are subject to, the invention utilizes a high temperature alloy material, such as molybdenum for example, to form the vanes 60. It should be understood that molybdenum in only one example of a high temperature alloy material that could be used, any other high temperature alloy materials suitable for forming gas turbine engine components could also be used such as monolithic ceramic material, or a ceramic matrix composite material for example. The high temperature alloy material can withstand operating temperatures within a range of 2400-2700 degrees Fahrenheit (1316-1482 degrees Celsius), which is a much higher range than traditional airfoil materials can withstand. Traditional materials, such as a nickel alloy material for example, can only withstand temperatures up to 2200 degrees Fahrenheit (1204 degrees Celsius).

Figure 4:
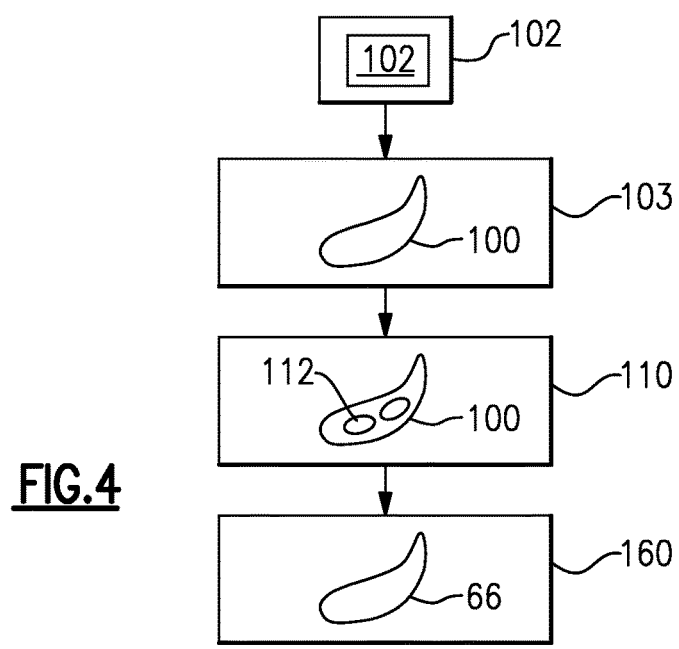
FIG. 4 shows a method of forming a gas turbine engine component.
Figure 3:
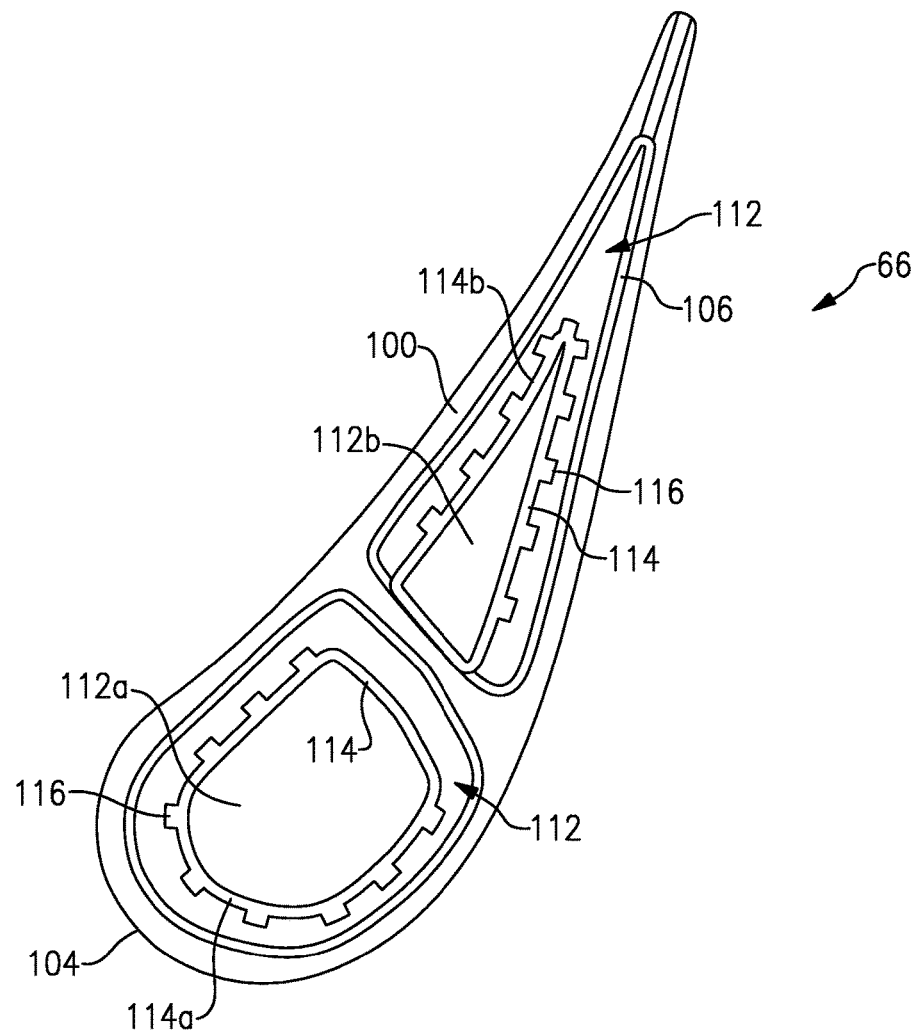
FIG. 3 is a schematic cross-sectional view of an airfoil section of the vane of FIG. 2.

As shown in FIG. 3, the airfoil section 66 is made by forming an airfoil body 100 from a block comprised of a high temperature alloy material as indicated at 102 (FIG. 4). The block 102 comprised of the high temperature alloy material is originally forged as one piece. Any type of forging process can be used to form the block 102. An external surface 104 of the block is machined, as indicated at 103 to form the airfoil body 100 which extends from an outer diameter surface 106 to an inner diameter surface 108 (FIG. 2).

At least one cooling passage 112 is machined within the airfoil body 100 as indicated at 110 (FIG. 4). The cooling passage 112 is open to at least one of the outer 106 and inner 108 diameter surfaces. The cooling passage is machined to have smooth walls. At least one insert 114 with a heat transfer feature 116 is positioned within the at least one cooling passage 112.

In co-pending application Ser. No. 14/794,861 filed concurrently herewith and assigned to the assignee of the subject invention, heat transfer features are formed directly on the internal walls of the airfoil. While this provides the most effective form of heat transfer, stress concentrations can be increased at locations of the intersection of the feature with the internal wall. The subject invention provides smooth walls and uses an insert 114 to provide the heat transfer features. This eliminates the possibility of stress concentrations within the passage.

In the example shown in FIG. 3, the at least one cooling passage 112 comprises at least first 112a and second 112b cooling passages. Further, the at least one insert 114 comprises at least first 114a and second 114b inserts. The first insert 114a is inserted into the first cooling passage 112a and the second insert 114b is inserted into the second cooling passage 112b. The inserts 114a, 114b are then fixed to the airfoil body 100. In one example, the inserts are welded in place; however, other attachment methods could also be used.

FIGS. 5A-E show various examples of inserts 114. In each example, the insert 114 is formed as hollow body 120 that is open to at least one of first 122 and second ends 124. The body 120 includes an external surface 126 and an internal surface 128 that defines an open center 130. The insert 114 has one or more heat transfer features 116 (FIG. 3) formed on at least one of the external surface 126 and internal surface 128 of the insert 114. Although shown as hollow bodies, FIGS. 5B through 5E may also be solid or formed into other shapes such as flat plates, in which case, internal surface 128 and cavity 130 would not be present.

In one example, the insert 114 is formed by bending a sheet of metal to form the hollow body 120. The heat transfer features 116 can be formed on the sheet prior to, or after, bending. In another example, the insert is formed by additive manufacturing techniques such as Direct Metal Laser Sintering (DMLS).

In the example of FIG. 5A, the heat transfer feature 116 is a plurality of cooling holes 134 that extend from the internal surface 128 to the external surface 126 of the insert 114. In other words, the holes 134 extend through the thickness of the metal sheet. The holes 134 can be distributed evenly over the body 120 in a regular or non-regular pattern.

In the example of FIG. 5B, the heat transfer feature 116 is a plurality of pins 138 that extend outwardly from the external surface 126 of the insert 114. The pins 138 can be distributed evenly over the body 120 in a regular or non-regular pattern. The pins 138 may extend to touch the walls of the cooling passages 112; however, the pins 138 are not required to touch the walls. Optionally, one or more pins 138 could extend outwardly a greater distance than the remaining pins 138 to secure the insert 114 to the airfoil body 100.

In the example of FIG. 5C, the heat transfer feature 116 is a plurality of rounded protrusions 140, e.g. deptowarts, which extend outwardly from the external surface 126 of the insert 114. The protrusions 140 can be distributed evenly over the body 120 in a regular or non-regular pattern. The protrusions 140 may extend to touch the walls of the cooling passages 112; however, the protrusions 140 are not required to touch the walls. Optionally, one or more protrusions 140 could extend outwardly a greater distance than the remaining protrusions 140 to secure the insert 114 to the airfoil body 100.

In the example of FIG. 5D, the heat transfer feature 116 is a plurality of trip strips 146, which extend outwardly from the external surface 126 of the insert 114. The trip strips 146 can be distributed evenly over the body 120 in a regular or non-regular pattern. In the example shown, the trip strips 146 are formed as V-shaped protrusions, but may be other shapes as well.

In the example of FIG. 5E, the heat transfer feature 116 is a plurality of dimples 150, which form recesses on the external surface 126 and protrusions on the internal surface 128. The dimples 150 can be distributed evenly over the body 120 in a regular or non-regular pattern.

Once the inserts 114 have been fixed within the passages 112, the open end of the passage 112, can be covered with a coverplate, tip cap, or other enclosing structure to form a completed airfoil section 66 as indicated at 160 in FIG. 4. Any additional external machining can then be done. The airfoil section 66 can be used as part of a gas turbine engine blade or vane, for example.

Figure 6:
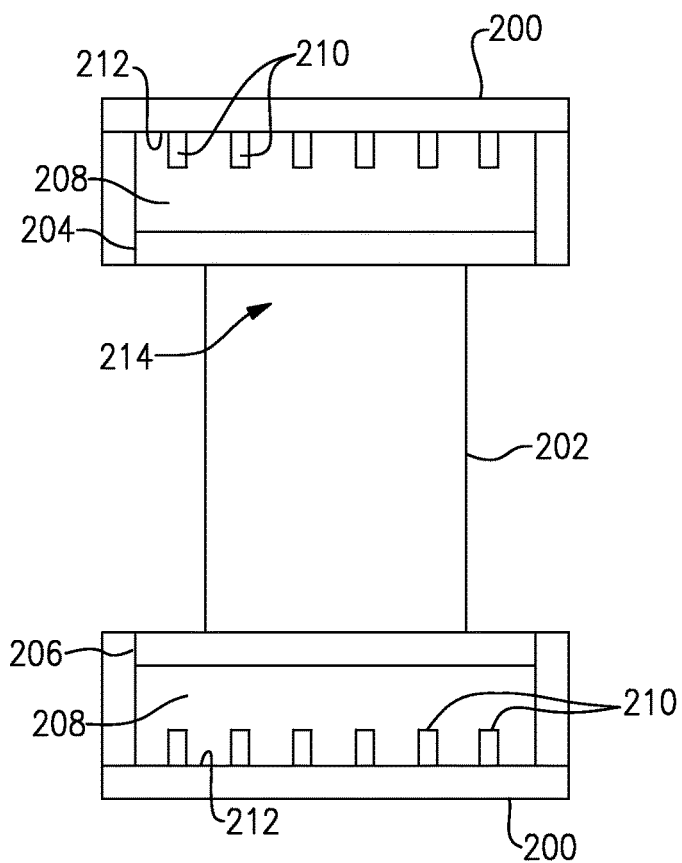
FIG. 6 shows an example of heat transfer features on a coverplate insert for a vane.

FIG. 6 shows an example of a coverplate insert 200 for a vane 202 extending between an outer platform 204 and an inner platform 206. The coverplate insert 200 is used to enclose a cooling passage 208 at one, or both, of the outer 204 and inner 206 platforms. The insert 200 comprises a generally flat panel having heat transfer features 210 formed on a surface 212 that faces the gaspath 214 such that the heat transfer features 210 extend into the cooling passage 208. The heat transfer features 210 can comprise any of the features as shown in FIGS. 5A-5E, for example.

Figure 7:
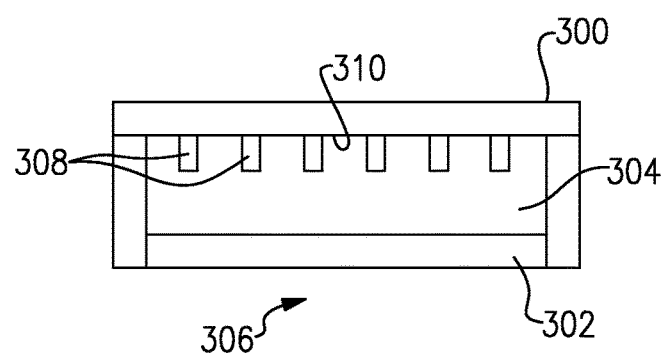
FIG. 7 shows an example of heat transfer features on a coverplate insert for a blade outer air seal (BOAS) or combustor panel.

FIG. 7 shows an example of a coverplate insert 300 for a BOAS or combustor panel 302. The coverplate insert 300 is used to enclose a cooling passage 304 that is separate from the gaspath 306. The insert 300 comprises a generally flat panel having heat transfer features 308 formed on a surface 310 that faces the gaspath 306 such that the heat transfer features 308 extend into the cooling passage 304. The heat transfer features 308 can comprise any of the features as shown in FIGS. 5A-5E, for example.

The subject invention utilizes a baffle or coverplate insert to further enhance cooling capability in an engine component formed from a high temperature alloy material. This results in a lower heat transfer as compared to features formed directly on the wall (see co-pending application referenced above), but will advantageously eliminate the stress concentrations that arise from forming the features in the wall. While airfoils made from traditional material, such as a nickel alloy material, can withstand those stress concentrations, the stress capability of the high temperature alloys is significantly less. Additionally, using the baffle or coverplate insert reduces cost as machining the heat transfer features on the component walls can be expensive.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for forming a gas turbine engine component comprising the steps of:
   (a) forming a block of a high temperature alloy material;
   (b) machining an external surface of the block to form an external surface of a gas turbine engine component;
   (c) machining at least a first cooling passage and a second cooling passage separated from the first cooling passage by a wall within the component that are open to at least one end of the component; and
   (d) forming at least first and second inserts with a heat transfer feature and installing the first insert within the first cooling passage and installing the second insert within the second cooling passage, and including forming the first and second inserts to have an internal surface and an external surface that is spaced apart from internal wall surfaces that form the first and second cooling passages, and including forming the heat transfer feature to comprise a plurality of protruding portions on the insert that do not contact the internal wall surfaces.

2. The method according to claim 1 wherein the high temperature alloy material can withstand operating temperatures within a range of 2400-2700 degrees Fahrenheit.

3. The method according to claim 1 wherein the high temperature alloy material comprises molybdenum or a monolithic ceramic material.

4. The method according to claim 1 wherein step (a) includes forging the block as a single piece structure.

5. The method according to claim 4 including performing step (b) prior to step (c).

6. The method according to claim 4 including performing step (c) prior to step (b).

7. The method according to claim 1 wherein step (c) includes machining the cooling passages to have smooth walls that comprise the internal wall surfaces.

8. The method according to claim 1 including (e) welding each insert to the airfoil body.

9. The method according to claim 1 wherein step (d) includes forming each insert as a hollow body that is open to at least one end of the insert, and with each insert having the heat transfer feature formed on at least one of the external surface and the internal surface of the insert.

10. The method according to claim 1 including forming the at least one heat transfer feature as a plurality of pins extending outwardly from a surface of the insert into the cooling passage.

11. The method according to claim 1 including forming the protruding portions as a plurality of rounded protrusions extending outwardly from a surface of the insert into the cooling passage.

12. The method according to claim 1 including forming protruding portions as a plurality of trip strips extending outwardly from a surface of the insert into the cooling passage.

13. The method according to claim 1 including forming the protruding portions as a plurality of dimples forming recesses on a surface of the insert.

14. A component for a gas turbine engine comprising:
    a body formed from a high temperature alloy material, the body extending between an outer surface and an inner surface spaced radially inward of the outer surface;
    at least a first cooling passage and a second cooling passage separated from the first cooling passage by a wall, wherein the at least first and second cooling passages are formed in the body, and are open to at least one of the outer and inner surfaces, and wherein the first and second cooling passages have smooth walls extending in a radial direction, and are spaced apart from each other in an axial direction that is transverse to the radial direction;
    at least a first insert and a second insert, each with a heat transfer feature, and wherein the first insert is positioned within the first cooling passage and the second insert is positioned within the second cooling passage, and wherein the first and second inserts have an internal surface and an external surface that is spaced apart the smooth walls, and wherein the heat transfer feature comprises a plurality of protruding portions on the insert that do not contact the smooth walls; and
    a cover attached to the body over an open end of the cooling passage to enclose the insert within the body.

15. The component according to claim 14 wherein the high temperature alloy material can withstand operating temperatures within a range of 2400-2700 degrees Fahrenheit.

16. The component according to claim 14 wherein the high temperature alloy material comprises molybdenum, a monolithic ceramic material, or a ceramic matrix composite material.

17. The component according to claim 14 wherein the protruding portions comprise at least one of
    a plurality of pins extending outwardly from the insert into the cooling passage,
    a plurality of rounded protrusions extending outwardly from the insert into the cooling passage, a plurality of trip strips extending outwardly from the insert into the cooling passage, or a plurality of dimples forming recesses on the insert.

18. The component according to claim 14 wherein the body comprises one of a gas turbine engine vane, blade, BOAS, or combustor panel.

19. The component according to claim 14 wherein the body comprises a forged material that can withstand operating temperatures within a range of 2400-2700 degrees Fahrenheit.

20. The component according to claim 14 wherein each insert comprises a hollow body that extends continuously from the inner surface to the outer surface.

21. The method according to claim 1 including enclosing the insert within the cooling passage by placing a cover on the at least one end of the component to cover an open end of the cooling passage.

22. The method according to claim 1 including
forming the insert by bending sheet metal to form a hollow body, or
forming the insert by an additive manufacturing process.

* * * * *